(12) United States Patent  
Patsilaras et al.

(10) Patent No.: US 9,355,038 B2  
(45) Date of Patent: May 31, 2016

(54) CACHE BANK SPREADING FOR COMPRESSION ALGORITHMS

(71) Applicant: QUALCOMM Incorporated, San Diego, CA (US)

(72) Inventors: George Patsilaras, Del Mar, CA (US); Andrew Edmund Turner, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/483,902

(22) Filed: Sep. 11, 2014

(65) Prior Publication Data

US 2016/0077973 A1    Mar. 17, 2016

(51) Int. Cl.
*G06F 12/06* (2006.01)
*G06F 12/08* (2016.01)

(52) U.S. Cl.
CPC .................................. *G06F 12/0893* (2013.01)

(58) Field of Classification Search
CPC .............................. G06F 12/06; G06F 12/0893
See application file for complete search history.

(56) References Cited

U.S. PATENT DOCUMENTS

| | | | |
|---|---|---|---|
| 5,956,744 A | 9/1999 | Robertson et al. | |
| 6,633,244 B2 | 10/2003 | Avery et al. | |
| 7,266,651 B1 | 9/2007 | Cypher | |
| 7,705,753 B2 | 4/2010 | Speirs et al. | |
| 7,996,597 B1 | 8/2011 | Venkatramani et al. | |
| 2003/0133352 A1* | 7/2003 | Roohparvar | G11C 7/1006 365/230.03 |
| 2011/0087840 A1 | 4/2011 | Glasco et al. | |
| 2013/0238565 A1 | 9/2013 | Resch et al. | |

OTHER PUBLICATIONS

International Search Report and Written Opinion—PCT/US2015/041781—ISA/EPO—Oct. 26, 2015.
Compression of data in implanted memory, IP.com Prior Art Database Disclosure, IP.com Disclosure No. IPCOM000219504D, Publication Date: Jul. 4, 2012, 3 pages.

* cited by examiner

*Primary Examiner* — John Lane
(74) *Attorney, Agent, or Firm* — The Marbury Law Group, PLLC

(57) ABSTRACT

Aspects include computing devices, systems, and methods for implementing a cache memory access requests for compressed data using cache bank spreading. In an aspect, cache bank spreading may include determining whether the compressed data of the cache memory access fits on a single cache bank. In response to determining that the compressed data fits on a single cache bank, a cache bank spreading value may be calculated to replace/reinstate bank selection bits of the physical address for a cache memory of the cache memory access request that may be cleared during data compression. A cache bank spreading address in the physical space of the cache memory may include the physical address of the cache memory access request plus the reinstated bank selection bits. The cache bank spreading address may be used to read compressed data from or write compressed data to the cache memory device.

30 Claims, 11 Drawing Sheets

| | Physical Address | Physical Address Bits | Physical Address Bank Select Bits | Bank Spreading Physical Address | Bank Spreading Physical Address Bits | Bank Spreading Physical Address Bank Select Bits |
|---|---|---|---|---|---|---|
| 816 | 0xABCD000 | 0000 0000 | 00 | 0xABCD000 | 0000 0000 | 00 |
| 818 | 0xABCD100 | 0001 0000 | 10 | 0xABCD180 | 0001 1000 | 11 |
| 820 | 0xABCD200 | 0010 0000 | 00 | 0xABCD280 | 0010 1000 | 01 |
| 822 | 0xABCD300 | 0011 0000 | 10 | 0xABCD300 | 0011 0000 | 10 |
| 824 | 0xABCD400 | 0100 0000 | 00 | 0xABCD400 | 0100 0000 | 00 |
| 826 | 0xABCD500 | 0101 0000 | 10 | 0xABCD580 | 0101 1000 | 11 |
| 828 | 0xABCD600 | 0110 0000 | 00 | 0xABCD680 | 0110 1000 | 01 |
| 830 | 0xABCD700 | 0111 0000 | 10 | 0xABCD700 | 0111 0000 | 10 |

FIG. 8

CACHE BANK SPREADING FOR COMPRESSION ALGORITHMS

BACKGROUND

Lossless compressions use data segments of configurable sizes, which are compressed. This compressed data is then stored in caches until it is written back to memory. However, by compressing data, unused holes in the physical address space are created. Depending on how the compressed data is stored in physical address space, there can be uneven use of system level resources such as the caches. Caches store data at a cache line granularity, and use the most frequently used bits to route data into banks. The mismatch between the compressed block sizes and the cache line size can result in irregular use of the cache resources (e.g., banks). This irregular use is created by the compressed data clearing unused bits in the physical address, which are used in cache indexing. For example, such a case occurs when compressing a 256 byte block into 128 bytes, which will clear the address bits for the compressed data in the physical address. Lower address bits are typically used for cache selection decisions in order to create balanced accesses (since they change frequently). If bit W of the lower address bits would normally be used to select a cache bank, the compressed data will always be located in half the banks/cache because the value will always be the same when bit W is cleared (i.e., after compression bit W=0). Similarly, if two bits, such as bit W and bit Y, would normally be used to select a cache bank, the compressed data will always be located in half the banks/cache because, while the value of bit Y may change (i.e., after compression bit Y will equal 0 or 1), the value of bit W would remain static (i.e., bit W=0), and therefore the bank selection bits W and Y together may combine for only two of four bank selection options (i.e., bits Y and W=00 or 10, instead of 00, 01, 10, or 11).

SUMMARY

The methods and apparatuses of various aspects provide circuits and methods for executing cache memory access requests for compressed data on a computing device, which may include reinstating one or more bank select bits of a physical address of a cache memory access request producing a cache bank spreading address, and executing the cache memory access request at the cache bank spreading address.

An aspect method may further include determining whether compressed data fits on a cache line of a single cache bank of a cache memory device, in which reinstating one or more bank select bits of a physical address of a cache memory access request producing a cache bank spreading address may be performed in response to determining that the compressed data fits on a single cache bank of the cache memory device. In an aspect, determining whether the compressed data of the cache memory access request fits on a single cache bank of the cache memory device may include determining whether a compression ratio of the compressed data is greater than or equal to a 2:1 compression ratio. In an aspect, determining whether the compressed data of the cache memory access request fits on a single cache bank of the cache memory device may include determining whether a size of the compressed data is less than or equal to a size of a cache line of the cache memory device.

In an aspect, reinstating one or more bank select bits of the physical address of the cache memory access request producing the cache bank spreading address in response to determining that the compressed data fits on a cache bank of the cache memory device may include selecting inputs for a cache bank spreading function, executing the cache bank spreading function, returning a cache bank spreading value, and replacing the one or more bank select bits with the cache bank spreading value. In an aspect, selecting inputs for the cache bank spreading function may include selecting a plurality of least significant bits of conserved bits of the physical address of the cache memory device of the cache memory access request as operands for a cache bank spreading function, and executing the cache bank spreading function may include using an exclusive OR operator with the operands. In an aspect, the cache bank spreading function may include using one of a logical operation, an arithmetic operation, selecting a random value, selecting the cache bank spreading address associated with the physical address of the cache memory access request from a table.

In an aspect, executing the cache memory access request for the compressed data at the cache bank spreading address in the cache memory device may include writing the compressed data to a first cache bank indicated by the one or more reinstated bank select bits of the cache bank spreading address different from a second cache bank indicated by one or more bank select bits of the physical address of the cache memory device of the cache memory access request, and reading the compressed data from the first cache bank indicated by the one or more reinstated bank select bits of the cache bank spreading address different from the second cache bank indicated by one or more bank select bits of the physical address of the cache memory device of the cache memory access request.

An aspect includes a computing device having a processor, a bank spreading function component, a cache memory controller, and a cache memory communicatively connected to each other in which the processor, the bank spreading function component, the cache memory controller are configured to perform operations of one or more of the aspect methods described above.

An aspect includes a non-transitory processor-readable medium having stored thereon processor-executable instructions configured to cause a processor, a bank spreading function component, and a cache memory controller to perform operations of one or more of the aspect methods described above.

An aspect includes a computing device having means for performing functions of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 8 is an example table illustrating a relationship between a physical address of a cache memory access request for compressed data and an associated bank spreading physical address in the cache in accordance with an aspect.

DETAILED DESCRIPTION

Figure 1:
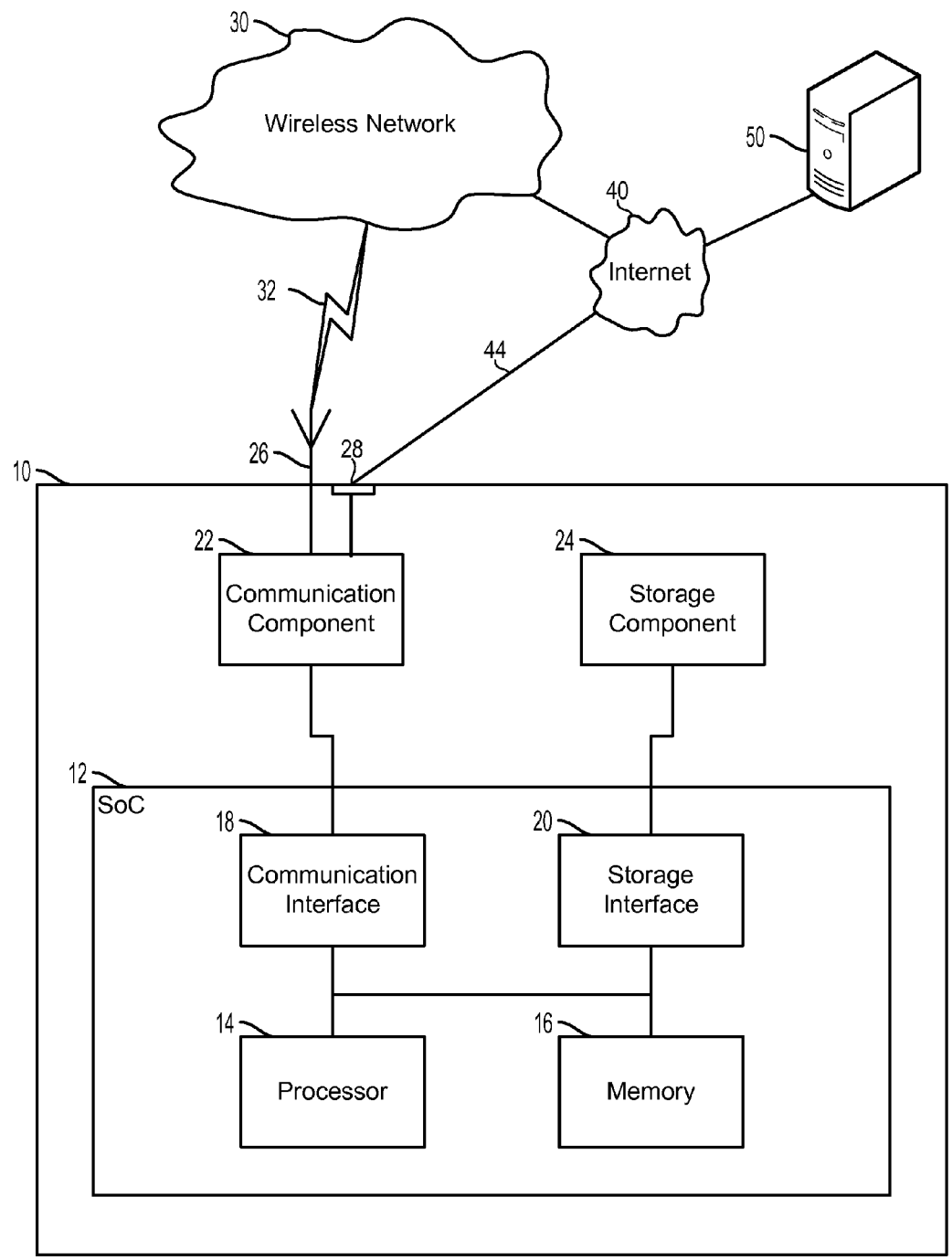
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile computing device" are used interchangeably herein to refer to any one or all of cellular telephones, smartphones, personal or mobile multi-media players, personal data assistants (PDA's), laptop computers, tablet computers, smartbooks, ultrabooks, palmtop computers, wireless electronic mail receivers, multimedia Internet enabled cellular telephones, wireless gaming controllers, and similar personal electronic devices that include a memory, and a multi-core programmable processor. While the various aspects are particularly useful for mobile computing devices, such as smartphones, which have limited memory and battery resources, the aspects are generally useful in any electronic device that implements a plurality of memory devices and a limited power budget in which reducing the power consumption of the processors can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In an aspect, cache bank spreading may be implemented in order to reduce the uneven use of cache resources for storing compressed data in a physical address space caused by mismatches in the size of the block of compressed data and the size of a cache line when the data is compressed. An arithmetic or operational function may be applied to bits of the address for storing a compressed data block in a cache to replace bits of the address for storing the compressed data that are cleared because the reduced size of the data block does not need to use the portions of the cache addressed by the cleared bits. In an aspect, to implement usage of more cache banks for compressed data, the portions of the address that specify the other cache banks may be recreated or reinstated through an arithmetic or operational function applied to bits of the address that are conserved during the data compression. In other words, by using an arithmetic operation on address bits, a bit specifying the cache bank (i.e., 1 or 0) may be added into the address to replace the bit cleared by the data compression. When compression algorithms clear a portion of the address that is used, at least in part, to determine the cache banks, an arithmetic operation may be applied to two or more of the conserved address bits to create a bank select bit in the cleared portion of the address.

For example, when a 256 bytes uncompressed data block is reduced in size to 128 bytes or less through data compression, the compressed data block requires only half of the cache space that the uncompressed data would require. In the same example, the cache memory may store 256 byte data blocks in 128 byte cache lines. In this example, two 128 byte cache lines may be divided among separate cache banks. Thus, the 128 bit compressed data may be stored in a first cache line on a first cache bank without the need for a second cache line on a second cache bank of the same cache. In such an example, when the data is compressed, portions of the address that specify the cache bank to use may be cleared by the compression. As described above, this may result in the compressed data being written to only half of the cache banks (e.g., the first cache bank) because the cleared portions of the address can no longer specify another cache bank (e.g., the second cache bank). Cache bank spreading may employ an arithmetic or operational function that will add in a bank selection bit.

The cache bank spreading operation of the various aspects may select portions of the address that alternate values frequently in order to achieve more frequent distribution of the compressed data across the various cache banks. For example, lower conserved bits of the cache address alternate more frequently than upper conserved bits of the cache address. Performing an operation with the tens and ones digits may result in more frequent variability in the addressed cache banks than using the hundreds and tens digits.

In an aspect in which a cleared portion of the address is used, at least in part, to determine the cache banks, two or more conserved portions may be used to recreate or reinstate the cleared portion. For example, using binary bits, a conserved bit and a cleared bit may be combined to select the cache bank. In aspects in which the cleared bit is constant (e.g., cleared bit=0) and a first conserved bit is variable (i.e., conserved bit=0 or 1), a cache bank select portion of the address may be 00 or 01. In aspects in which the cleared bit is not cleared and remains variable (e.g., not cleared bit=0 or 1), the cache bank select could be 00, 01, 10, or 11. Thus, the cleared bit limits the cache bank select to half of its potential values. Applying an arithmetic or operational function using the first conserved bit and a similarly variable second conserved bit, and replacing the cleared bit with a result of the function may restore the full array of potential values for the cache bank select. In an aspect, the function may include an Exclusive OR (XOR) of the first and second conserved bits.

The function applied to address bits may be any of a variety of arithmetic or operational functions that may be implemented in hardware and/or software. Operands for the function may be any of a variety of combinations of portions of the conserved address for the compressed data, or a portion of the conserved address for the compressed data and another variable. For example, a hash function may be implemented to use a variety of operands and output a limited set of values for replacing or reinstating the cleared portions of the address for the compressed data. In an aspect, the function may also include a random number generator.

FIG. 1 illustrates a system including a computing device 10 in communication with a remote computing device 50 suitable for use with the various aspects. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The SoC 12 may include one or more processors 14. The computing device 10 may include more than one SoCs 12, thereby increasing the number of processors 14 and processor cores. The computing device 10 may also include processor 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together.

The memory 16 of the SoC 12 may be a volatile or non-volatile memory configured for storing data and processor-executable code for access by the processor 14. In an aspect, the memory 16 may be configured to store data structures at least temporarily, such as intermediate processing data output by one or more of the processors 14. In an aspect, the memory 16 may be configured to store information for cache memory access request for compressed data using cache bank spreading. The memory 16 may include non-volatile read-only memory (ROM) in order to retain the information for cache bank spreading.

The computing device 10 and/or SoC 12 may include one or more memories 16 configured for various purposes. In an aspect, one or more memories 16 may be configured to be dedicated to storing the information for cache bank spreading. The memory 16 may store the information in a manner that enables the information to be accessed by the processor or dedicated controller for implementing cache bank spreading.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the information for cache bank spreading, such that information may be accessed by one or more processors 14. The storage component 24, being non-volatile, may retain the information even after the power of the computing device 10 has been shut off. When the power is turned back on and the computing device 10 reboots, the information stored on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
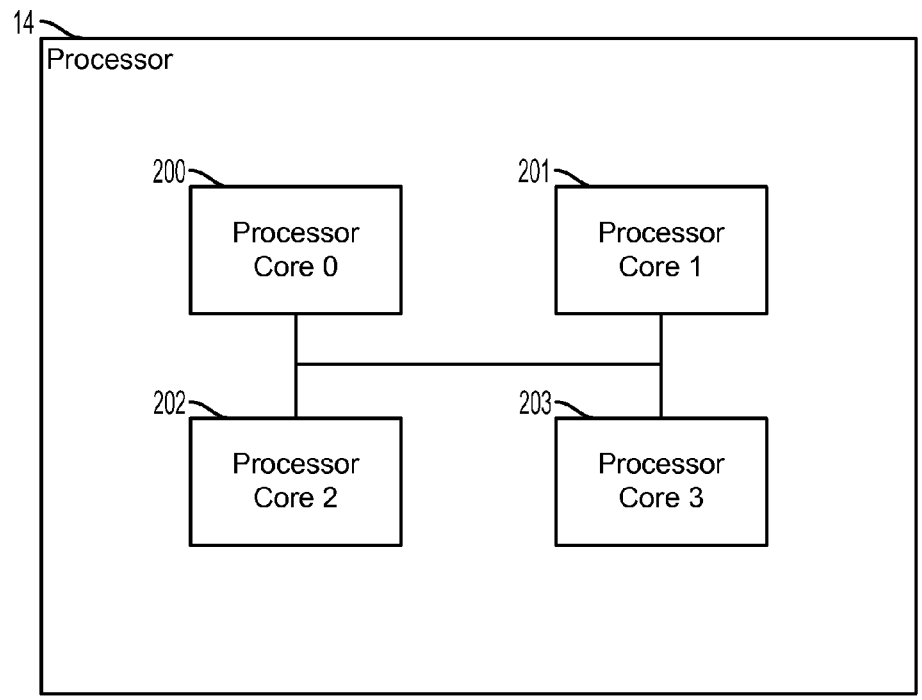
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively.

Through variations in the manufacturing process and materials, the performance characteristics of homogeneous processor cores 200, 201, 202, 203, may differ from processor core to processor core within the same multi-core processor 14 or within another multi-core processor 14 using the same designed processor cores.

The processor cores 200, 201, 202, 203 may be heterogeneous in that, the processor cores 200, 201, 202, 203 of a single processor 14 may be configured for different purposes and/or have different performance characteristics. Example of such heterogeneous processor cores may include what are known as "big.LITTLE" architectures in which slower, low-power processor cores may be coupled with more powerful and power-hungry processor cores.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various aspects to a four-core processor system. The computing device 10, the SoC 12, or the multi-core processor 14 may individually or in combination include fewer or more than the four processor cores 200, 201, 202, 203 illustrated and described herein.

Figure 3A:
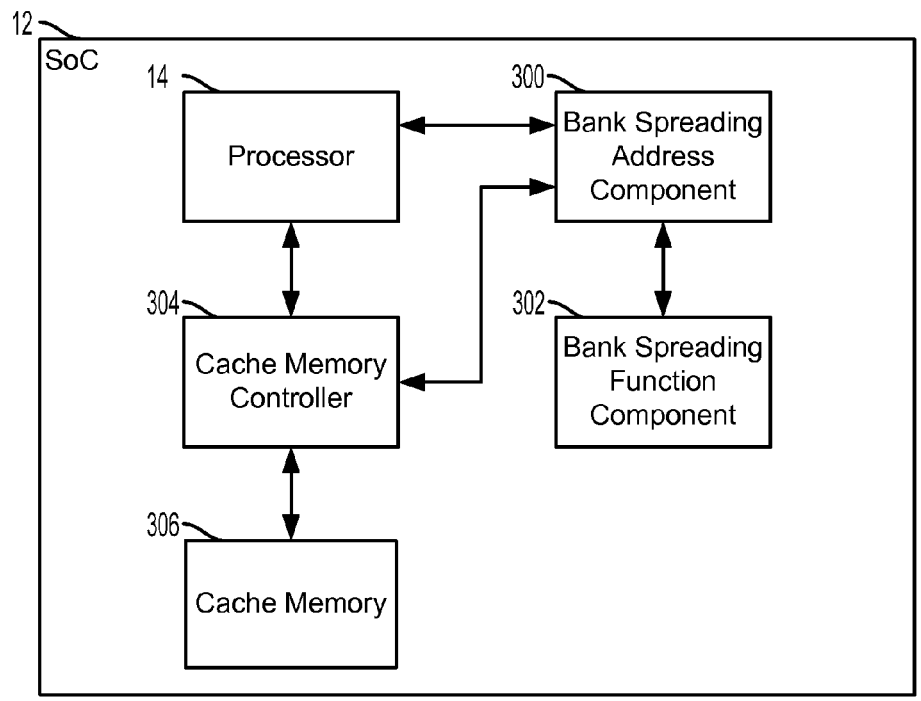
FIGS. 3A and 3B are component block diagrams illustrating examples of a system on chip (SoC) configured to implement cache bank spreading in accordance with an aspect.
Figure 3B:
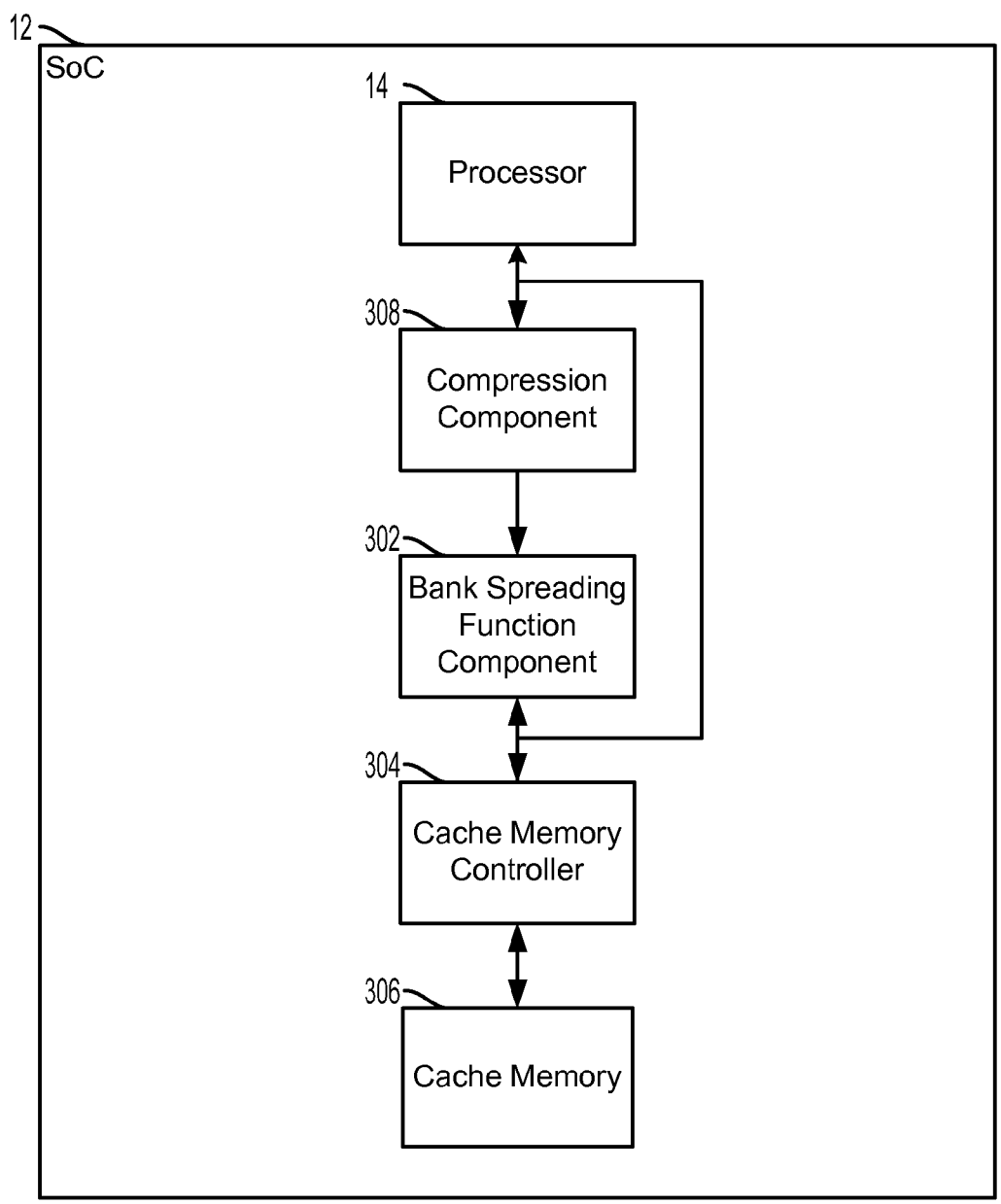

FIGS. 3A and 3B illustrate example SoCs 12 configured to implement cache bank spreading in accordance with an aspect. The SoC 12 may include the processor 14, a cache memory controller 304, a cache memory 306, and other components such as the components of the SoC 12 described above. The cache memory 306 may be configured to temporarily store data and program instructions for quicker access than when accessing the storage component 24 or memory 16 in FIG. 1. The cache memory 306 may be dedicated for use by a single processor 14 or shared between multiple processors 14. In an aspect, the cache memory 306 may be part of the processor 14, and may be dedicated for use by a single processor core or shared between multiple processor cores of the processor 14.

The cache memory controller 304 may manage access to the cache memory 306 by various processors 14 and subsystems (not shown) of the SoC 12. Part of the access management of the cache memory may include using cache bank spreading according to various aspects for write and read cache memory access request issued by the processor 14 to the cache memory 36 for compressed data. Cache bank spreading may be used for cache memory access request for compressed data that has a compression ratio or data size such that the compressed data is smaller than or equal to the size of a cache line. Further, the compressed data may also be no bigger than a cache bank of the cache memory. Applying cache bank spreading to the compressed data may result in the use of a cache bank spreading address, a physical address in the cache memory 306, modified from the physical address of the cache memory access request. For a write cache memory access request, the cache memory controller 304 may write the compressed data to the cache bank spreading address for the compressed data. For a read cache memory access request, the cache memory controller 304 may read the compressed data from the cache bank spreading address for the compressed data.

In an aspect, illustrated in FIG. 3A, the SoC 12 may include a cache bank spreading address component 300 and a cache bank spreading function component 302 configured to implement cache bank spreading. The cache memory controller 304 may initiate cache bank spreading for a received cache memory access request by sending the physical address of the cache memory access request to the cache bank spreading address component 300. The cache memory controller 304 may receive the translated bank spreading address corresponding to the physical address of the cache memory access request from the cache bank spreading address component 300. Translating the physical address of the cache memory access request to the cache bank spreading address is described further below.

The cache bank spreading address component 300 may be a data storage component, part of or separate from the cache memory controller 304, which may store one or more physical addresses of the cache memory 306. The physical addresses stored by the cache bank spreading address component 300 may include the physical address of the cache memory access request and/or the cache bank spreading address. In an aspect, the cache bank spreading address component 300 may receive the physical address of the cache memory access request from the cache memory controller 304 or the processor 14. The cache bank spreading address component 300 may provide the physical address of the cache memory access request to the cache bank spreading function component 302 for translation. The cache bank spreading address component 300 may receive the translated bank spreading address from the cache bank spreading function component 302 and replace the physical address of the cache memory access request with the cache bank spreading address. The cache bank spreading address component 300 may provide the cache bank spreading address to the cache memory controller 304 or the processor 14.

In an aspect, the cache bank spreading address component 300 may store data in a manner that correlates one or more physical addresses of the cache memory access requests with the corresponding bank spreading addresses. In an aspect the correlated addresses may be formatted into any data structure suitable for linking the correlated addresses, such as a table. In an aspect, each pair of correlated addresses may be stored to the cache bank spreading address component 300 in response to a cache memory access request for compressed data with the required compression ratio and/or size.

In an aspect some or all of the correlated addresses may be loaded to the cache bank spreading address component 300 before a cache memory access request is received for any physical address of the cache. For example, a particular portion of the cache memory 306 may be designated for storing compressed data that may be stored using cache bank spreading. The cache bank spreading addresses for this portion of the cache memory 306 may be determined, as described further herein, and stored to the cache bank spreading address component 300 before any cache memory access request is received for a physical address of this portion of the cache memory 306.

The cache bank spreading function component 302 may be a hardware or software implemented component, part of or separate from the cache memory controller 304, for translating the physical addresses of the cache memory access requests to corresponding bank spreading addresses. The cache bank spreading function used in translating the physical address of the cache memory access request to the corresponding bank spreading address may be any single or combination of known mathematical and/or operational functions.

In an aspect, the cache bank spreading function component 302 may employ a logical operation, such as an exclusive OR (XOR) operation, using a selection of bits of the physical address of the cache memory access request as operands for the cache bank spreading function. The result of the cache bank spreading function may include a replacement bit used to replace a bit that may have been cleared from the physical address of the cache memory access request by the data compression process. As discussed, the bit cleared during compression may be a cache bank selection bit, and as a result of clearing the cache bank selection bit, the physical address of the cache memory access request would always indicate the same value for the cleared cache bank selection bit. The cache memory controller 304 may use the bank selection bit to determine which bank of the cache memory 306 to write to or read from.

In an aspect the compressed data of the cache memory access request may be less than the size of a cache line, and therefore may be written to a single cache bank. When the cache bank select bit always indicates the same value for such compressed data, the compressed data may always be stored on the same cache bank or set of cache banks less than the whole set of cache banks. For example, the physical address of the cache memory access request may include only one bank selection bit. A single bank selection bit indicates one of two values, for example 0 or 1, each signifying one of two cache banks. As a result of the bank selection bit always indicating the same value, for example 0, the bank selection bit may only indicate the use of the one corresponding cache bank. This effectively reduces the use of the cache banks for the compressed data to half of the cache banks. Similar examples of cleared bits may include any number of some or all of the banks selection bits of the physical address of the cache memory access request. For example, a cache memory 306 including four cache banks may require the use of two bank selection bits in a physical address. The cleared bits resulting from the data compression may include one or both of the bank selection bits of the physical address. As a result, the banks used for the data compressed to at least half of its previous size may be limited to half or a quarter of the cache banks. The cache bank spreading function component 302 may be used to restore the use of some or all of the cache banks for the sufficiently small compressed data.

In an aspect, the cache bank spreading function component 302 may receive a physical address from the cache bank spreading address component 300. As described above, the physical address may be a physical address of a cache memory access request, or it may be a physical address associated with a portion of the cache memory designated to store compressed data. The cache bank spreading function component 302 may use portions of the physical address in determining the result of the cache bank spreading function. The result may be used to replace bank selection bit of the physical address to produce the corresponding bank spreading address. The cache bank spreading function component 302 may provide the cache bank spreading address to the cache bank spreading address component 300.

In an aspect, the processor 14 may initiate cache bank spreading by sending the physical address of the cache memory access request to the cache bank spreading address component 300. The processor 14 or the cache memory controller 304 may receive the translated bank spreading address from the cache bank spreading address component 300. In an aspect in which the processor 14 receives the cache bank spreading address, the processor 14 may include the cache bank spreading address in a cache memory access request to the cache memory controller 304. In an aspect in which the cache memory controller 304 receives a cache memory access request from the processor 14, and the cache bank spreading address from the processor 14 or the cache bank spreading address component 300, the cache memory controller 304 may implement the cache memory access request using the cache bank spreading address.

In an aspect illustrated in FIG. 3B, the SoC 12 may include a compression component 308 configured to compress data provided by the processor 14 for a write cache memory access request sent to the cache memory 306. The compression component 308 may output a compressed version of the data provided by the processor 14 for the write cache memory access request. The processor 14 may instruct the compression component 308 to compress the data according to a compression parameter. The compression parameter may include a compression ratio, a compressed data size, or a compressed data quality. In an aspect, the compression component may be a programmable hardware component which may receive program instructions from the processor 14 or may be preprogrammed with a compression rule or algorithm for determining the compression of the data. In an aspect, the compression rule or algorithm may be a static compression parameter. In an aspect, the compression component 308 may be a program software configured to compress data. The compression component 308 may receive input values as compression parameters from the processor 14 or other program software for instructing the compression component 308 how to compress the data. In an aspect, the program software compression component 308 may include a compression rule or algorithm like the programmable hardware compression component 308 described above. The compression component 308 may include the compression parameters, such as the data size, compression ratio, and compression quality with an output of the compressed data. For example, the compression parameters may be included in metadata of the compressed data.

The output of the compression component 308, the compressed data, may be received at the bank spreading function component 302. As described above, the cache bank spreading function component 302 may receive the physical addresses of the cache memory access request, and translate it to a corresponding bank spreading address. The cache bank spreading function used in translating the physical address of the cache memory access request to the corresponding bank spreading address may be any single or combination of known mathematical and/or operational functions.

The cache bank spreading function component 302 may also receive the compression parameters for the compressed data, and use the compression parameters for determining how to translate the physical address to the cache bank spreading address. As discussed in further detail herein, the compression of the data may modify the physical address of the cache memory access request issued by the processor 14. The modifications to the physical address may include changing the values of one or more cache memory bank select bits. The compression parameters may indicate to the cache bank spreading function component 302 how the physical address may be modified by the compression of the data, and which of the modifications of the physical address to further modify.

The cache bank spreading function component 302 may further modify the physical address of the compressed data, for example, by reinstating one or more of the bank select bits. The cache bank spreading function component 302 reinstating one or more of the bank select bits may (or may not) return the bank select bits to their original value. However, reinstating the bank select bits may change the value of the bank select bits from a static value for all of the same bank select bits for similarly compressed data, to dynamic value which may change based on conserved bits from the physical address.

In an aspect, the cache bank spreading function may be implemented in a manner similar to the following pseudocode:

```
BankSpreading(BaseAddr, CompressionLevel){
    PhysicalAddressShift = 0
    if ( CompressionLevel == "4:1" or CompressionLevel == "4:2"){
        Bit1= (BaseAddr >> Bit1ToBeUsed) & 1
        Bit2 = (BaseAddr >> Bit2ToBeUsed) & 1
        PhysicalAddressShift = (Bit1 XOR Bit2) << W
    }
    return BaseAddr + PhysicalAddressShift
}
```

In the above pseudo code example, the BaseAddr input to the BankSpreading function may include the physical address of the cache memory access request. The CompressionLevel may include a compression parameter, such as the compression ration of the compressed data of the cache memory access request. The PhysicalAddressShift may be determined when the CompressionLevel satisfies the conditions of a conditional statement. In this example, the CompressionLevel may be equivalent to a 4:1 or 4:2 compression ratio for the compressed data. To determine the PhysicalAddressShift, Bit1 and Bit2 variables may be set to a specified bit of the BaseAddr input. Using the Bit1 and Bit2 variables, the PhysicalShiftAddress may be set to Bit1 XOR Bit2 shifted to reinstate the cleared bit, for example shifting it by W positions where W is the position of the address bit cleared during compression. As described above, and mathematical or operational function may replace the XOR function in this example. The output of the BankSpreading function may include the BaseAddr input combined with the PhysicalAddressShift. In an aspect, the combination of these values may reinstate one or more cleared bank select bits of the physical address and produce the cache bank spreading address for the cache memory access request.

The bank spreading function component 302 may forward the cache bank spreading address, and/or the cache memory access request, to the cache memory controller 304. As described above the cache memory controller 304 may use the cache bank spreading address to implement the cache memory access request with the cache memory 306.

Figure 4:
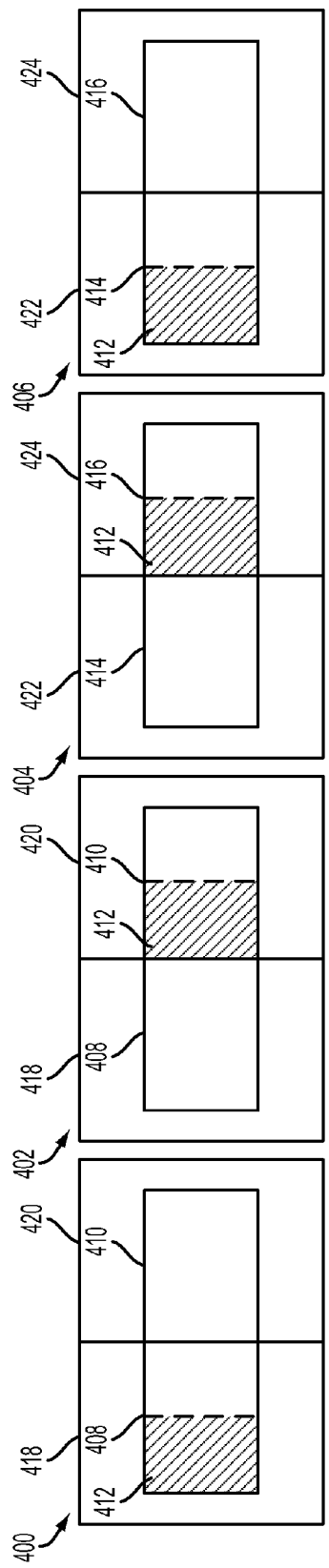
FIG. 4 is an illustration of a portion of a cache memory including a cache line composed of cache space on multiple cache banks storing compressed data in accordance with an aspect.

FIG. 4 illustrates a portion of a cache memory including a cache space 400, 402, 404, and 406 composed of cache lines 408, 410, 414, and 416 on multiple cache banks 418, 420, 422, and 424 storing compressed data 412 in accordance with an aspect. As illustrated in this example, each cache line 408, 410, 414, and 416 may be located on a separate cache bank 418, 420, 422, and 424. The compressed data 412 is illustrated to occupy approximately one half of each cache line 408, 410, 414, and 416. In this example, a pre-compressed data and the cache space 400, 402, 404, and 406 may be approximately 256 bytes. The cache lines 408, 410, 414, and 416 may each be approximately 128 bytes. The pre-compressed data may be compressed to approximately 64 bytes resulting in the compressed data 412. The compression ratio for the compressed data 412 may be 4:1. In other words, the compressed data 412 may be a quarter or 25% of the size of the pre-compressed data. Thus, the compression ratio for the compressed data 412 is greater than or equal to a 2:1 compression ratio, or the size of compressed data 512 may be smaller than or equal to the size of a cache line 408, 410, 414, and 416. This may result in the compressed data 512 to be small enough to fit in a single cache line 408, 410, 414, and 416.

Each cache bank 418, 420, 422, and 424 may be associated with a particular combination of bank select bits in a physical address of a cache memory access request. In this example, the physical addresses may include two bank select bits. Bank select bits value=00 may be associated with cache bank 418. Similarly bank select bits value=01 may be associated with cache bank 420, bank select bits value=10 with cache bank 422, and bank select bits value=11 with cache bank 424. In an aspect in which the compression clears all of the bank select bits, resulting in, for example, the bank select bits value always=00, only cache bank 418 may be used to store compressed data 412 as in cache space 400. In a similar aspect in which the compression algorithm clears the least significant bank selection bit, resulting in, for example, the bank select bits value always=00 or 10, only cache banks 418 and 422 may be used to store compressed data 412 as in cache spaces 400 and 406. In an aspect, the cleared bank selection bits may be set to "1" rather than "0". Thus, without cache bank spreading some of the cache banks 418, 420, 422, and 424 may be used less often than other cache banks 418, 420, 422, and 424, if at all, resulting in uneven use.

In an aspect in which cache bank spreading is implemented for a cache memory access request for the compressed data 412, which may normally be limited to being stored in less than all half or less of the cache banks 418, 420, 422, and 424, may be stored in more than the limited number of the cache banks 418, 420, 422, and 424. Cache bank spreading may be used to reinstate one or more of the cleared bank selection bits of a physical address of a cache memory access request. In an aspect using two bank select bits in which all of the bank select bits are cleared, cache bank spreading may be used to reinstate one or both of the bank select bits. In an aspect, the bank select bits may be reinstated using the cache bank spreading function with entirely different or different in part operands. For example, conserved (or not cleared) bits of the physical address of the cache memory access request may be used as the operands for the cache bank spreading function. For the implementation of the cache bank spreading function for a first cleared bank selection bit, the cache bank spreading function may use a first and second conserved bit. For a second cleared bank selection bit, the cache bank spreading function may use either the first or the second conserved bit and a third conserved bit, or the third and a fourth conserved bit.

Regardless of the operands used, the cache bank spreading function may result in the use of more of the cache banks 418, 420, 422, and 424 for a cache memory access request. As discussed above, in an aspect in which the compression algorithm clears two bank selection bits, the bank selection bit values may =00, allowing for use of only cache bank 418 as in cache space 400. In aspects in which cache bank spreading reinstates one of two cleared bank selection bits, the bank selection bit values may =00 and one of 01 or 10, allowing for additional use of one of the cache bank 420 as in cache space 402 or the cache bank 422 as in cache space 406. In an aspect in which the compression algorithm clears one of two bank selection bits, the bank selection bit values may =00 and one of 01 or 10, allowing for use of cache bank 418 as in cache space 400, and one of the cache bank 420 as in cache space 402 or the cache bank 422 as in cache space 406. In aspects in which cache bank spreading reinstates the cleared bank selection bit, the bank selection bit values may =00, 01, 10, and 11, allowing for use of cache banks 418, 420, 422, and 424 as in cache spaces 400, 402, 404, and 406.

The number of cache banks used in the examples herein is not meant to be limiting in any way. Cache memories may include cache lines of various sizes including more or fewer cache banks than described in the examples herein. Cache bank spreading may be similarly applied in cache memories having any number of cache banks. Similarly, the bank select bits of the physical addresses of the cache memory may vary. In an aspect, the number of bank select bits may be influenced by the number of cache banks employed by the cache memory. In an aspect, the number of reinstated bank select bits may also vary, resulting in the use of some or all of the cache banks.

Figure 5:
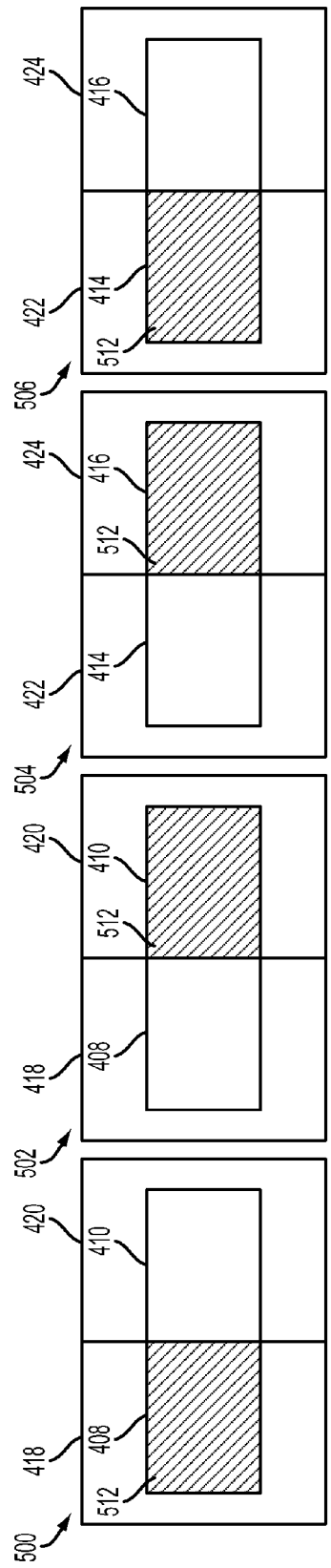
FIG. 5 is an illustration of a portion of a cache memory including cache lines on multiple cache banks storing compressed data in accordance with an aspect.

FIG. 5 illustrates a portion of a cache memory including a cache space 500, 502, 504, and 506 composed of cache lines 408, 410, 414, and 416 on multiple cache banks 418, 420, 422, and 424 storing compressed data 512 in accordance with an aspect. The example illustrated in FIG. 5 is similar to the example illustrated in FIG. 4. The difference between the examples is that compressed data 512 may be larger than compressed data 412. In this example, a pre-compressed data and the cache space 500, 502, 504, and 506 may be approximately 256 bytes. The cache lines 408, 410, 414, and 416 may each be approximately 128 bytes. The pre-compressed data may be compressed to approximately 128 bytes resulting in the compressed data 512. The compression ratio for the compressed data 512 may be 2:1. In other words, the compressed data 512 may be a half or 50% of the size of the pre-compressed data. Thus, the compression ratio for the compressed data 512 is greater than or equal to a 2:1 compression ratio, or the size of compressed data 512 may be smaller than or equal to the size of a cache line 408, 410, 414, and 416. This may result in the compressed data 512 to be small enough to fit in a single cache line 408, 410, 414, and 416.

Since the compressed data 512 may fit in a single cache line 408, 410, 414, and 416, like the compressed data 412, all of the aspects described above using compressed data 412 may also apply to compressed data 512. In similar examples, cleared bank selection bits may limit the number of banks 418, 420, 422, and 424 used for compressed data 512. In the example illustrated in FIG. 5, the cleared bank selection bits may result in the use of only one or two of the four available cache banks 418, 420, 422, and 424. Further, cache bank spreading may be used to reinstate one or more of the cleared bank selection bits, increasing the number of usable cache banks 418, 420, 422, and 424.

Figure 6:
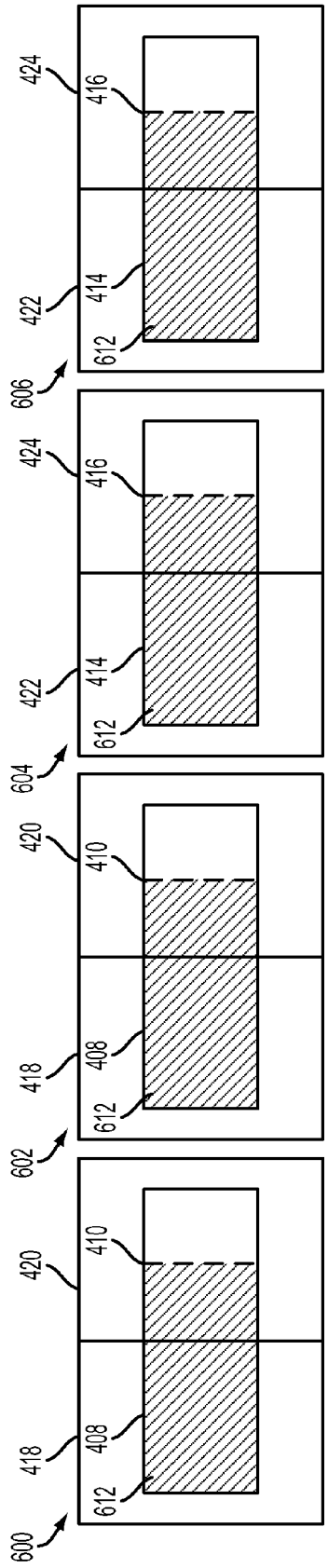
FIG. 6 is an illustration of a portion of a cache memory including cache lines on multiple cache banks storing compressed data in accordance with an aspect.

FIG. 6 illustrates a portion of a cache memory including a cache space 600, 602, 604, and 606 composed of cache lines 408, 410, 414, and 416 on multiple cache banks 418, 420, 422, and 424 storing compressed data 612 in accordance with an aspect. Unlike the previous examples in FIGS. 4 and 5, compressed data 612 does not fit into a single cache line 408, 410, 414, and 416. Continuing with the above examples, a pre-compressed data and the cache space 600, 602, 604, and 606 may be approximately 256 bytes. The cache lines 408, 410, 414, and 416 may each be approximately 128 bytes. The pre-compressed data may be compressed to approximately 192 bytes resulting in the compressed data 612. The compression ratio for the compressed data 512 may be 4:3. In other words, the compressed data 612 may be three quarters or 75% of the size of the pre-compressed data. Thus, the compression ratio for the compressed data 612 is less than a 2:1 compression ratio, or a size of the compressed data may be larger than a cache line 408, 410, 414, and 416. This may result in the compressed data 612 being too big to fit in a single cache line 408, 410, 414, and 416 on a single cache bank 418, 420, 422, and 424. In an aspect, the bank selection bits for compressed data 612 may be irrelevant because the compressed data 612 may be stored on multiple cache banks 418, 420, 422, and 424 for the respective cache spaces 600, 602, 604, and 606. Therefore, cache bank spreading may not be used for compressed data 612.

Figure 7:
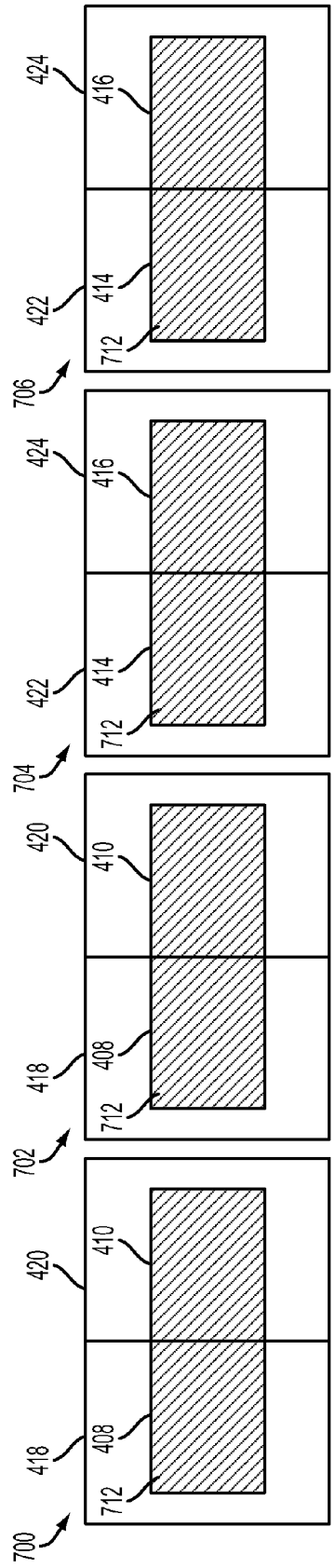
FIG. 7 is an illustration of a portion of a cache memory including cache lines on multiple cache banks storing compressed or uncompressed data in accordance with an aspect.

FIG. 7 illustrates a portion of a cache memory including a cache space 700, 702, 704, and 706 composed of cache lines 408, 410, 414, and 416 on multiple cache banks 418, 420, 422, and 424 storing compressed data 712 in accordance with an aspect. Similar to the example in FIG. 6, the compressed data 712 does not fit into a single cache line 408, 410, 414, and 416. Regardless of the compression ratio for the compressed data 712, since the compressed data 712 may not fit into cache line 408, 410, 414, and 416 on a single cache bank 418, 420, 422, and 424, the bank selection bits may be irrelevant. In an aspect, the bank selection bits for compressed data 712 may be irrelevant because the compressed data 712 may be stored on multiple cache banks 418, 420, 422, and 424 for the respective cache spaces 700, 702, 704, and 706. Therefore, cache bank spreading may not be used for compressed data 712.

FIG. 8 illustrates an example table 800 of the relationships between physical addresses of a cache memory access requests for compressed data and an associated bank spreading physical address in the cache in accordance with an aspect. The table 800 may include columns for the physical address of the cache memory 802 that may be used in a cache memory access request for compressed data, a binary bit representation of a portion of physical address (or physical address bits) 804, the physical address bank select bits 806, the cache bank spreading address 808, a binary bit representation of a portion of bank spreading address (or bank spreading address bits) 810, and the cache bank spreading address bank select bits 812. The table 800 may also include rows 814-830 for one or more physical addresses of the cache memory that may be used for the cache memory access request for compressed data using bank spreading.

In an aspect, the physical address 802 may include a 0 value in one or more least significant digits. These 0 values may represent the portions of the physical address cleared by the data compression. The physical address bits 804 may represent the most significant digit of the cleared portions of the physical address 802 and the least significant digit of the conserved portions of the physical address 802. The physical address bank select bits 806 may represent the bank select bits, in this example two bits, for the physical address 802 where the least significant bit may be cleared and the most significant bit may be conserved. As described above, it may be apparent that for half of the physical addresses 802 in the rows 816, 820, 824, and 828, the physical address bank select bits 806 may all=00. Similarly, for the other half of the physical addresses 802 in the rows 818, 822, 823, and 830, the physical address bank select bits 806 may all=10. Thus, only half of the bank selection bit combinations may be used, limiting the use of the cache banks by half.

In an aspect, the cache bank spreading address 808, the cache bank spreading address bits 810, and the cache bank spreading address bank select bits 812 may represent data correlated with the physical address 802 of the same row 814-830 resulting from implementing cache bank spreading. In an aspect, cache bank spreading may be implemented using the XOR operator with the two least significant bits of the conserved bits shown in the physical address bits 804. Cache bank spreading may be used to reinstate the least significant/cleared physical address bank select bit 806. For example, in row 816, the physical address bank select bits 806=10. The two least significant bits of the conserved bits shown in the physical address bits 804=01 Implementing cache bank spreading in this example may include 0 XOR 1=1. The result of the cache bank spreading may be reinstating the cleared physical address bank select bit 806 with the value 1 producing the cache bank spreading address bank select bits 812=11. This may be reflected in the cache bank spreading address bits 810 in which the least significant digit of the conserved portions of the physical address 802 remains the same, and the most significant digit of the cleared portions of the physical address 802 is updated. For example, in the physical address bits 804, the most significant digit of the cleared portions of the physical address 802=0000 Implementing cache bank spreading may result in updating the physical address bits 804 producing the cache bank spreading address bits 810 in which the most significant digit of the cleared portions of the physical address 802=1000. The physical address 802=0xABCD100 may be similarly updated producing the corresponding bank spreading address 808=0xABCD180.

The table 800 illustrates that implementing cache bank spreading may increase the number of cache banks used for cache memory access requests for compressed data as there are more combinations of bank spreading address bank select bits 812 (00, 01, 10, and 11) than physical address bank select bits 806 (00 and 10). The table 800 also illustrates that not every implementation of cache bank spreading may result in bank spreading address bank select bits 812 different from the physical address bank selection bits 806, as in the example in row 814.

Figure 9:
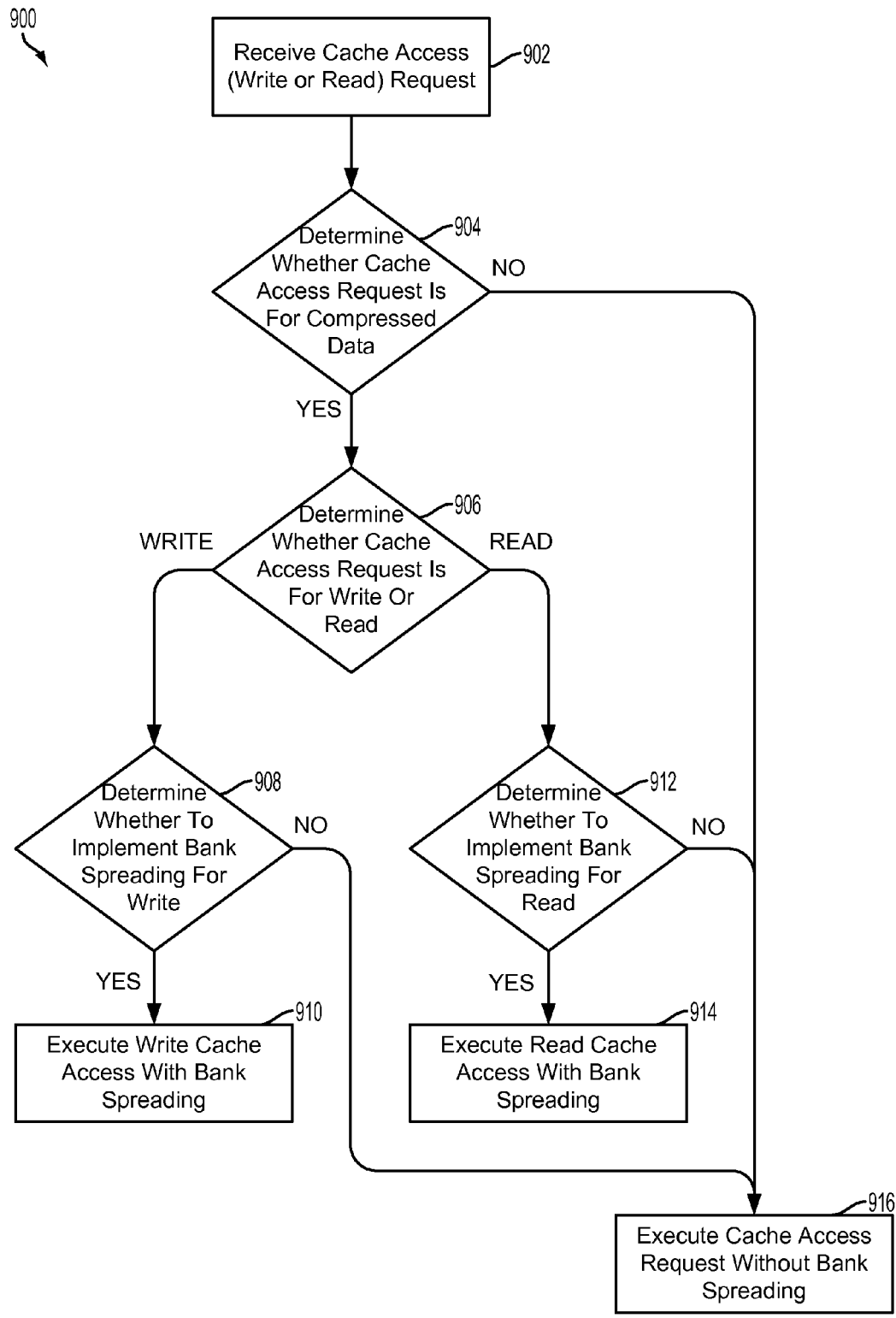
FIG. 9 is a process flow diagram illustrating an aspect method for implementing cache bank spreading for a cache memory access request for compressed data.

FIG. 9 illustrates an aspect method 900 for implementing cache bank spreading for a cache memory access request for compressed data. The method 900 may be executed in a computing device using software, general purpose or dedicated hardware, such as the processor, bank spreading function component, or cache memory controller, or a combination of software and hardware. In block 902 the computing device may receive a write or read cache memory access request. A write cache memory access request may include compressed write data, a physical address for storing the compressed write data, an indication of the write data being compressed and/or an indication of the compression ratio for the compressed write data, and/or an indication of the size of the compressed write data. A read cache memory access request may include a physical address for retrieving compressed read data, an indication of the read data being compressed and/or an indication of the compression ratio for the compressed read data, and/or an indication of the size of the compressed read data.

In determination block 904, the computing device may determine whether the cache memory access request is for compressed data. The indication of the data of the cache memory access request being compressed and/or of the compression ratio for the requested data may be used to determine whether the cache memory access request is for compressed data. In an aspect, these indications may be used only for write cache memory access requests. Determining whether a read cache memory access requests is for compressed data may involve comparing the physical address for retrieving read data to a record indicating whether the data was compressed when it was stored to the cache memory as part of a prior write cache memory access request. In response to determining that the cache memory access request is not for compressed data (i.e., determination block 904="No"), the computing device may execute the cache memory access request without bank spreading in block 916.

In response to determining that the cache memory access request is for compressed data (i.e., determination block 904="Yes"), the computing device may determine whether the cache memory access request is for writing compressed data or reading compressed data in determination block 906. Each cache memory access request may include an instruction for either writing to the cache memory or reading from the cache memory.

In response to determining that the cache memory access request is for writing compressed data (i.e., determination block 906="Write"), the computing device may determine whether to implement cache bank spreading for writing the compressed data in determination block 908. As discussed above, cache bank spreading may not be implemented for all compressed data. Implementing cache bank spreading may be condition upon the compressed data being of a designated size, i.e. able to fit on a single cache memory bank, and/or of designated compression ratio, i.e. greater than or equal to 2:1. In an aspect, the computing device may compare the size of the compressed data of the cache memory access request with a size for the cache memory banks. When the size of the compressed data is less than or equal to the size of the cache memory banks, the computing device may determine that the computing device request may be implemented using cache bank spreading. Similarly, when cache memory access requests are issued for data no greater than a standardized size, the standardized size may be the same size as a cache line. The computing device may be aware of the cache line size, and in an aspect the number of cache memory banks used for each cache line. A regular cache memory access request may be for data no greater than the cache line size, and using all of the cache memory banks for the cache line. Thus, knowing the compression ratio of the cache memory access request for compressed data, the computing device may determine how many of the cache memory banks the compressed data may use. In an aspect, when the compression ratio is such that the compressed data uses half or less than half of the cache memory banks, the computing device may determine that the cache memory access request may be implemented using cache bank spreading.

In response to determining that the write cache memory access request may be implemented using cache bank spreading (i.e., determination block 908="Yes"), the computing device may execute the write cache memory access request for compressed data using cache bank spreading in block 910 according to various aspects as described herein. In response to determining that the write cache memory access request may not be implemented using cache bank spreading (i.e., determination block 908="No"), the computing device may execute the cache memory access request without bank spreading in block 916.

In response to determining that the cache memory access request is for reading compressed data (i.e., determination block 906="Read"), the computing device may determine whether to implement cache bank spreading for reading the compressed data in determination block 912. Determining whether to implement cache bank spreading for reading the compressed data may be implemented in a manner that is similar writing compressed data as described above with reference to determination block 908. In response to determining that the read cache memory access request may be implemented using cache bank spreading (i.e., determination block 908="Yes"), the computing device may execute the read cache memory access request for compressed data using cache bank spreading, as described further herein. In response to determining that the read cache memory access request may not be implemented using cache bank spreading (i.e., determination block 908="No"), the computing device may execute the cache memory access request without bank spreading in block 916.

In an aspect, it may not be necessary to differentiate between a write cache memory access request and a read cache memory access request. In either instance, it may be that executing a cache memory access request with cache bank spreading may be accomplished in the same way as described below.

Figure 10:
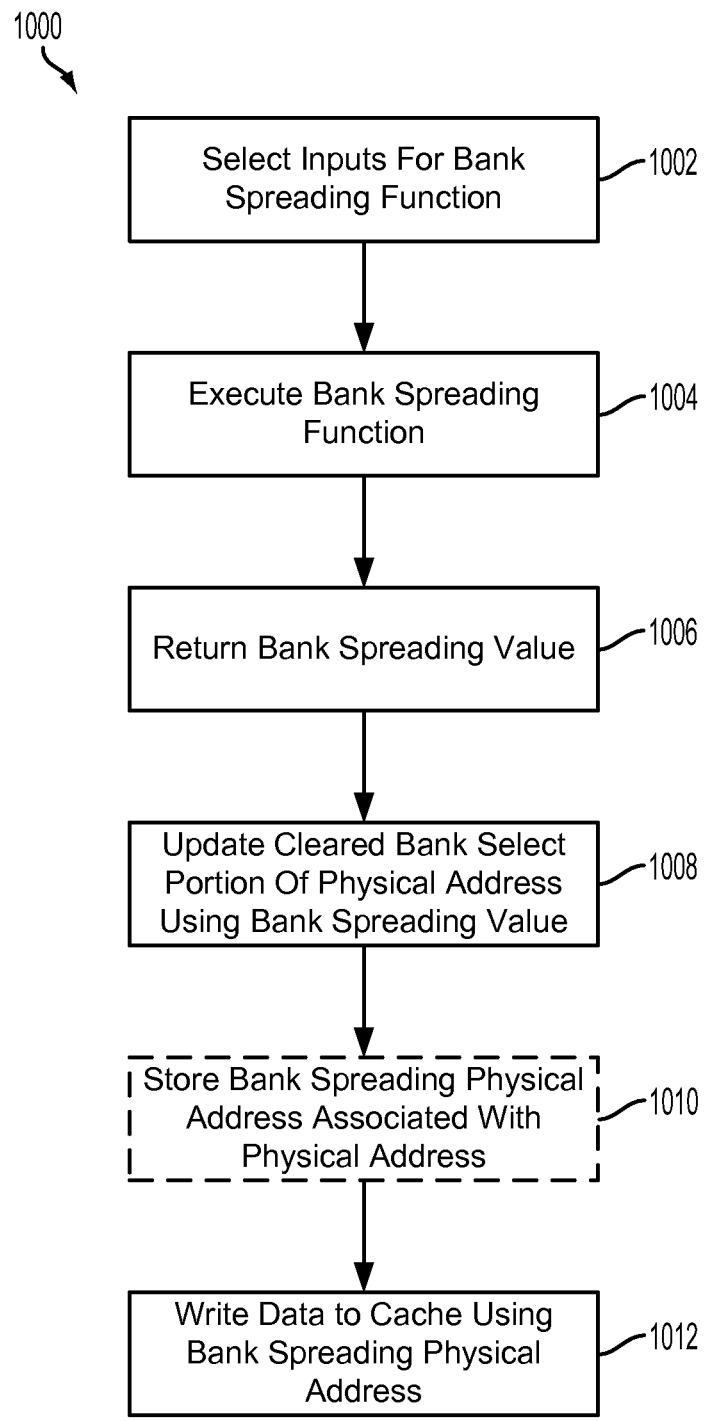
FIG. 10 is a process flow diagram illustrating an aspect method for implementing cache bank spreading for a write cache memory access request for compressed data.

FIG. 10 illustrates an aspect method 1000 for implementing cache bank spreading for a write cache memory access request for compressed data. The method 1000 may be executed in a computing device using software, general purpose or dedicated hardware, such as the processor, bank spreading function component, or cache memory controller, or a combination of software and hardware. In block 1002, the computing device may select inputs for the cache bank spreading function. As described above, the cache bank spreading function may be one of or a combination of any number of known mathematical and operational functions. In an aspect, the cache bank spreading function may be a logical exclusive OR (XOR) operation of two conserved bits of the physical address of the cache memory access request. The inputs for the cache bank spreading function may be selected according to a predetermined rule, such as selecting a first and second conserved bit of the physical address of the cache memory access request. In an aspect the inputs for the cache bank spreading function may be selected according to an adaptive algorithm based on one or more of a variety of factors, such as cache memory architecture, cache memory size, including cache line size, and/or number of cache banks per cache line.

In block 1004, the computing device may apply the cache bank spreading function to the selected input(s). In block 1006, the cache bank spreading function may return a cache bank spreading value. The cache bank spreading value may be any value that may be used to reinstate one or more cleared bank selection bits as described above. For example, when reinstating two bank selection bits, the cache bank spreading value may include two bit values for replacing the cleared bank selection bits, such as 00, 01, 10, and 11. These values are not limited to the binary representation shown in this example, and may be implemented using an alternative representation for such values.

In block 1008, the computing device may update the cleared portion of the physical address of the cache memory access request for compressed data by reinstating the cleared bank select bits using the cache bank spreading value.

In optional block 1010, the computing device may store the cache bank spreading address, or the updated physical address. The cache bank spreading address may be temporarily stored for subsequent use in the instant cache memory access request. In an aspect the cache bank spreading address may be stored along with a correlation to the physical address from which the cache bank spreading address is calculated for later cache memory access requests so that the cache bank spreading address does not have to be recalculated.

In block 1012, the computing device may write the compressed data to the cache memory using the cache bank spreading address. In an aspect, the method 1000 may also be implemented for a read memory access request, and in block 1012 the computing device may instead read the compressed data from the cache memory using the cache bank spreading address.

Figure 11:
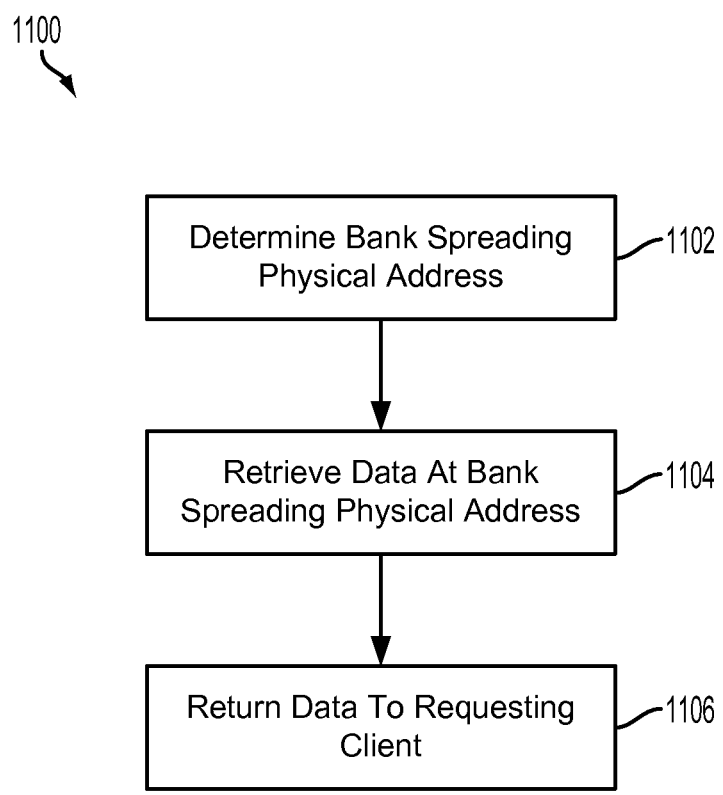
FIG. 11 is a process flow diagram illustrating an aspect method for implementing cache bank spreading for a read cache memory access request for compressed data.

FIG. 11 illustrates an aspect method 1100 for implementing cache bank spreading for a read cache memory access request for compressed data. The method 1100 may be executed in a computing device using software, general purpose or dedicated hardware, such as the processor, bank spreading function component, or cache memory controller, or a combination of software and hardware. In block 1102, the computing device may determine the cache bank spreading address for the read cache memory access request for the compressed data. In an aspect, the computing device may compare the physical address of the read cache memory access request for the compressed data to a stored data structure correlating the physical address with an already determined bank spreading address. As described above, various situations may lead to the cache bank spreading address being determined before a read cache memory access request for the compressed data, such as a write memory cache access request for the compressed data. In an aspect, the banks spreading address may be determined even before the write memory cache access request for the compressed data, such as for pre-calculating the cache bank spreading addresses for a group of physical address designates for storage of compressed data. In an aspect, the cache bank spreading address may be determined, as described above, in response to the read cache memory access request for the compressed data.

In block 1104, the computing device may retrieve the compressed read data stored at the determined cache bank spreading address. In block 1106, the computing device may return the compressed read data to the client that requested the compressed read data, such as the processor or one of the subsystems of the SoC.

Figure 12:
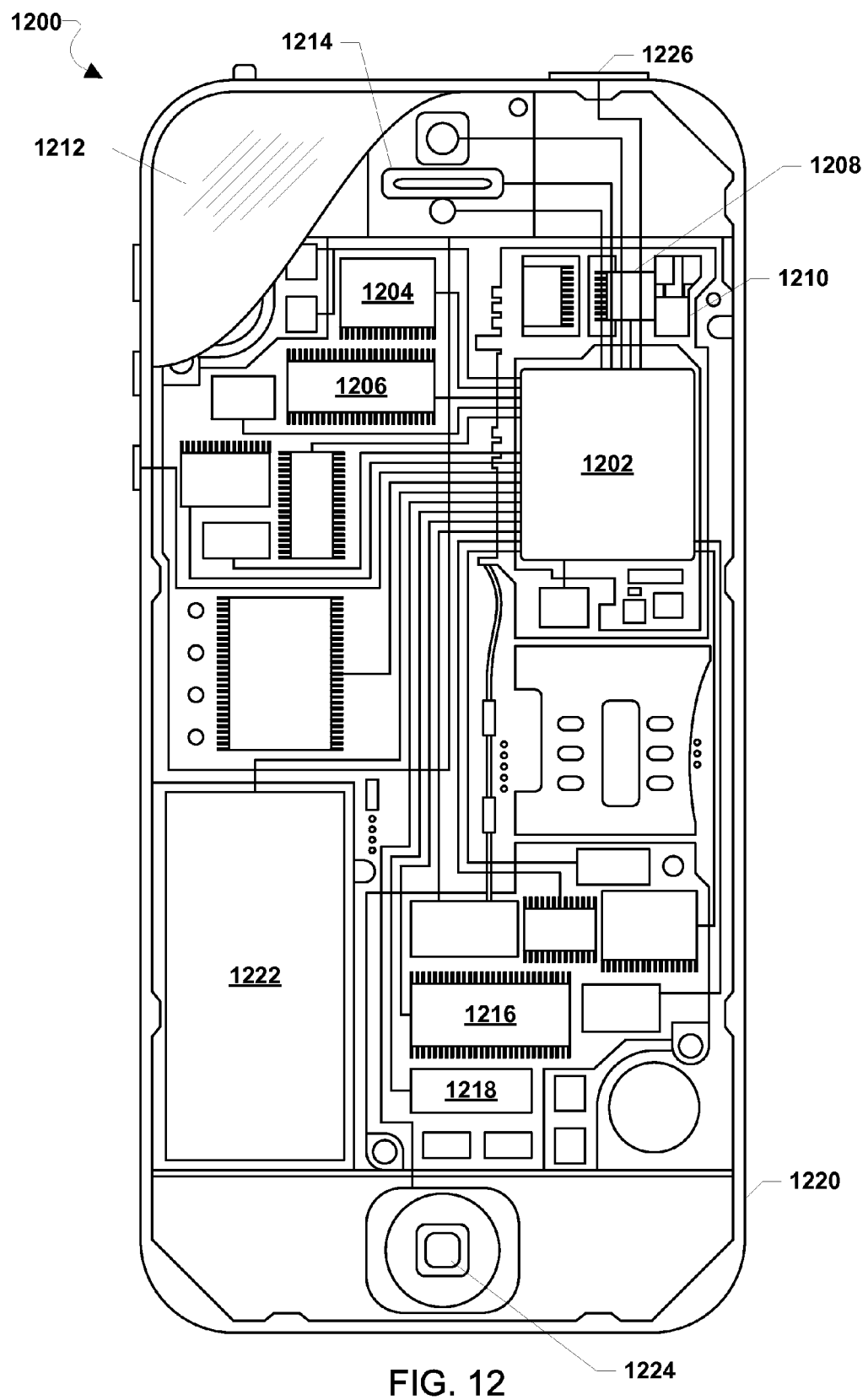
FIG. 12 is component block diagram illustrating an example mobile computing device suitable for use with the various aspects.
Figure 13:
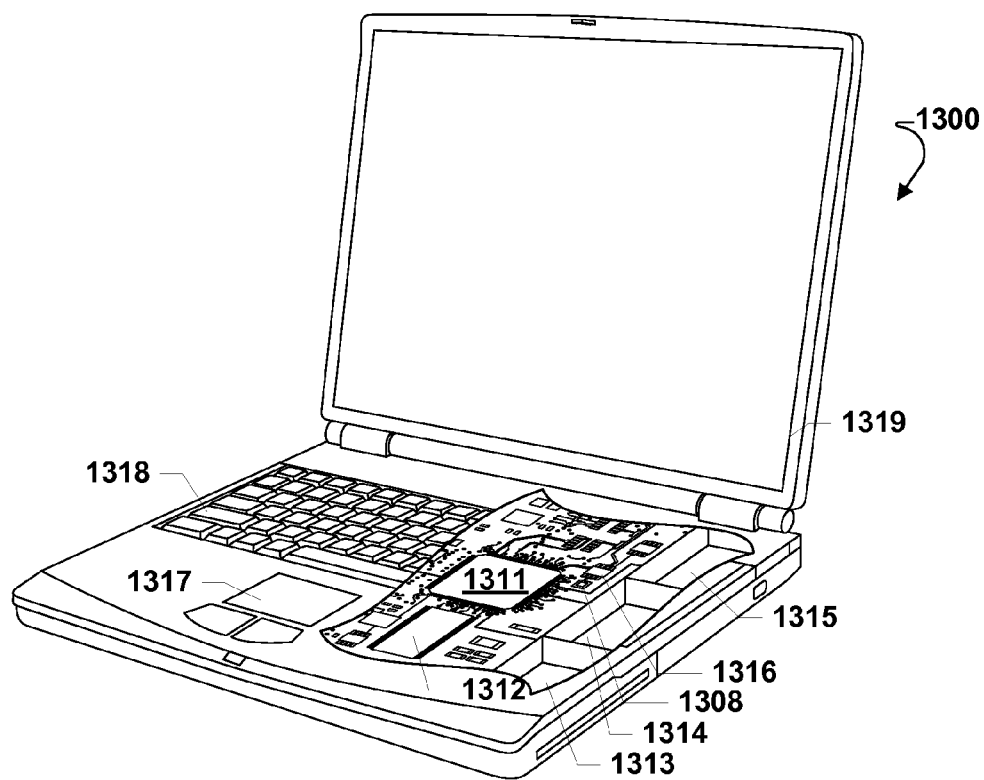
FIG. 13 is component block diagram illustrating an example mobile computing device suitable for use with the various aspects.
Figure 14:
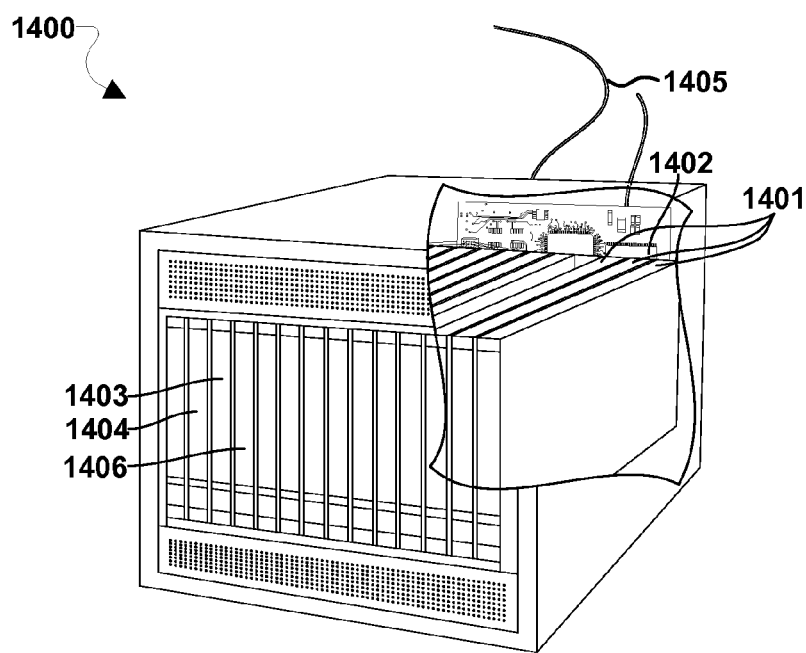
FIG. 14 is component block diagram illustrating an example server suitable for use with the various aspects.

The various aspects (including but not limited to aspects discussed above with respect to FIGS. 1-3B and 8-11) may be implemented on a variety of computing devices, examples of which are illustrated in FIGS. 12-14.

FIG. 12 illustrates an example mobile computing device suitable for use with the various aspects. The mobile computing device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1204 and the processor 1202 may also be coupled to a touchscreen panel 1212, such as a resistive-sensing touchscreen, capacitive-sensing touchscreen, infra-red sensing touchscreen, etc. Additionally, the display of the computing device 1200 need not have touch screen capability.

The mobile computing device 1200 may have one or more radio signal transceivers 1208 (e.g., Peanut, Bluetooth, Zigbee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The mobile computing device 1200 may include a cellular network wireless modem chip 1216 that enables communication via a cellular network and is coupled to the processor.

The mobile computing device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as USB, FireWire, Thunderbolt, or PCIe. The peripheral device connection interface 1218 may also be coupled to a similarly configured peripheral device connection port (not shown).

The mobile computing device 1200 may also include speakers 1214 for providing audio outputs. The mobile computing device 1200 may also include a housing 1220, constructed of a plastic, metal, or a combination of materials, for containing all or some of the components discussed herein. The mobile computing device 1200 may include a power source 1222 coupled to the processor 1202, such as a disposable or rechargeable battery. The rechargeable battery may also be coupled to the peripheral device connection port to receive a charging current from a source external to the mobile computing device 1200. The mobile computing device 1200 may also include a physical button 1224 for receiving user inputs. The mobile computing device 1200 may also include a power button 1226 for turning the mobile computing device 1200 on and off.

The various aspects described above may also be implemented within a variety of mobile computing devices, such as a laptop computer 1300 illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various aspects.

The various aspects may also be implemented in any of a variety of commercially available servers for compressing data in server cache memory. An example server 1400 is illustrated in FIG. 14. Such a server 1400 typically includes one or more multi-core processor assemblies 1401 coupled to volatile memory 1402 and a large capacity nonvolatile memory, such as a disk drive 1404. As illustrated in FIG. 14, multi-core processor assemblies 1401 may be added to the server 1400 by inserting them into the racks of the assembly. The server 1400 may also include a floppy disc drive, compact disc (CD) or DVD disc drive 1406 coupled to the processor 1401. The server 1400 may also include network access ports 1403 coupled to the multi-core processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments in which code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for executing cache memory access requests for compressed data on a computing device, comprising:
reinstating one or more bank select bits of a physical address of a cache memory access request producing a cache bank spreading address; and
executing the cache memory access request at the cache bank spreading address.

2. The method of claim 1, further comprising determining whether compressed data fits on a cache line of a single cache bank of a cache memory device,
wherein reinstating one or more bank select bits of a physical address of a cache memory access request producing a cache bank spreading address comprises reinstating the one or more bank select bits of the physical address of the cache memory access request producing the cache bank spreading address in response to determining that the compressed data fits on a single cache bank of the cache memory device.

3. The method of claim 2, wherein determining whether the compressed data of the cache memory access request fits on a single cache bank of the cache memory device comprises determining whether a compression ratio of the compressed data is greater than or equal to a 2:1 compression ratio.

4. The method of claim 2, wherein determining whether the compressed data of the cache memory access request fits on a single cache bank of the cache memory device comprises determining whether a size of the compressed data is less than or equal to a size of a cache line of the cache memory device.

5. The method of claim 2, wherein reinstating one or more bank select bits of the physical address of the cache memory access request producing the cache bank spreading address in response to determining that the compressed data fits on a cache bank of the cache memory device comprises:
selecting inputs for a cache bank spreading function;
executing the cache bank spreading function;
returning a cache bank spreading value; and
replacing the one or more bank select bits with the cache bank spreading value.

6. The method of claim 5, wherein:
selecting inputs for the cache bank spreading function comprises selecting a plurality of least significant bits of conserved bits of the physical address of the cache memory device of the cache memory access request as operands for the cache bank spreading function; and
executing the cache bank spreading function comprises using an exclusive OR operator with the operands.

7. The method of claim 5, wherein executing the cache bank spreading function comprises using one of a logical operation, an arithmetic operation, selecting a random value, selecting the cache bank spreading address associated with the physical address of the cache memory access request from a table.

8. The method of claim 1, wherein executing the cache memory access request at the cache bank spreading address comprises:
writing compressed data to a first cache bank indicated by the one or more reinstated bank select bits of the cache bank spreading address different from a second cache bank indicated by one or more bank select bits of the physical address of a cache memory device of the cache memory access request; and
reading the compressed data from the first cache bank indicated by the one or more reinstated bank select bits of the cache bank spreading address different from the second cache bank indicated by one or more bank select bits of the physical address of the cache memory device of the cache memory access request.

9. The method of claim 1, wherein executing the cache memory access request at the cache bank spreading address comprises executing the cache memory access request for the compressed data at a physical address of a cache memory device indicated by the cache bank spreading address.

10. A computing device, comprising:
a processor;
a bank spreading function component communicatively connected to the processor and configured to perform operations comprising reinstating one or more bank select bits of a physical address of a cache memory access request producing a cache bank spreading address;
a cache memory controller communicatively connected to the bank spreading function component and configured to perform operations comprising executing the cache memory access request at the cache bank spreading address; and
a cache memory communicatively connected to the cache memory controller.

11. The computing device of claim 10, wherein:
the bank spreading function component is configured to perform operations further comprising determining whether compressed data fits on a cache line of a single cache bank of the cache memory; and
the bank spreading function component is configured to perform operations such that reinstating one or more bank select bits of a physical address of a cache memory access request producing a cache bank spreading address comprises reinstating the one or more bank select bits of the physical address of the cache memory access request producing the cache bank spreading address in response to determining that the compressed data fits on a single cache bank of the cache memory.

12. The computing device of claim 11, wherein the bank spreading function component is configured to perform operations such that determining whether the compressed data of the cache memory access request fits on a single cache bank of the cache memory comprises determining whether a compression ratio of the compressed data is greater than or equal to a 2:1 compression ratio.

13. The computing device of claim 11, wherein the bank spreading function component is configured to perform operations such that determining whether the compressed data of the cache memory access request fits on a single cache bank of the cache memory comprises determining whether a size of the compressed data is less than or equal to a size of a cache line of the cache memory.

14. The computing device of claim 11, wherein the bank spreading function component is configured to perform operations such that reinstating one or more bank select bits of the physical address of the cache memory access request producing the cache bank spreading address in response to determining that the compressed data fits on a cache bank of the cache memory comprises:
selecting inputs for a cache bank spreading function;
executing the cache bank spreading function;
returning a cache bank spreading value; and
replacing the one or more bank select bits with the cache bank spreading value.

15. The computing device of claim 14, wherein the bank spreading function component is configured to perform operations such that:
executing the cache bank spreading function comprises using one of an exclusive OR operator with operands, a logical operation, an arithmetic operation, selecting a random value, selecting the cache bank spreading address associated with the physical address of the cache memory access request from a table; and selecting inputs for the cache bank spreading function comprises selecting a plurality of least significant bits of conserved bits of the physical address of the cache memory of the cache memory access request as the operands for the cache bank spreading function using an exclusive OR operator with the operands.

16. The computing device of claim 10, wherein the cache memory controller is configured to perform operations such that executing the cache memory access request at the cache bank spreading address in the cache memory comprises:

writing compressed data to a first cache bank indicated by the one or more reinstated bank select bits of the cache bank spreading address different from a second cache bank indicated by one or more bank select bits of the physical address of the cache memory of the cache memory access request; and reading the compressed data from the first cache bank indicated by the one or more reinstated bank select bits of the cache bank spreading address different from the second cache bank indicated by one or more bank select bits of the physical address of the cache memory of the cache memory access request.

17. A non-transitory processor-readable medium having stored thereon processor-executable instructions configured to cause a processor, a bank spreading function component, and a cache memory controller to perform operations comprising:

reinstating one or more bank select bits of a physical address of a cache memory access request producing a cache bank spreading address; and executing the cache memory access request at the cache bank spreading address.

18. The non-transitory processor-readable medium of claim 17, wherein:

the stored processor-executable instructions are configured to cause a processor, a bank spreading function component, and a cache memory controller to perform operations further comprising determining whether compressed data fits on a cache line of a single cache bank of a cache memory device, and the stored processor-executable instructions are configured to cause a processor, a bank spreading function component, and a cache memory controller to perform operations such that reinstating one or more bank select bits of a physical address of a cache memory access request producing a cache bank spreading address comprises reinstating the one or more bank select bits of the physical address of the cache memory access request producing the cache bank spreading address in response to determining that the compressed data fits on a single cache bank of the cache memory device.

19. The non-transitory processor-readable medium of claim 18, wherein the stored processor-executable instructions are configured to cause a processor, a bank spreading function component, and a cache memory controller to perform operations such that determining whether the compressed data of the cache memory access request fits on a single cache bank of the cache memory device comprises determining whether a compression ratio of the compressed data is greater than or equal to a 2:1 compression ratio.

20. The non-transitory processor-readable medium of claim 18, wherein the stored processor-executable instructions are configured to cause a processor, a bank spreading function component, and a cache memory controller to perform operations such that determining whether the compressed data of the cache memory access request fits on a single cache bank of the cache memory device comprises determining whether a size of the compressed data is less than or equal to a size of a cache line of the cache memory device.

21. The non-transitory processor-readable medium of claim 18, wherein the stored processor-executable instructions are configured to cause a processor, a bank spreading function component, and a cache memory controller to perform operations such that reinstating one or more bank select bits of the physical address of the cache memory access request producing the cache bank spreading address in response to determining that the compressed data fits on a cache bank of the cache memory device comprises:

selecting inputs for a cache bank spreading function;
executing the cache bank spreading function;
returning a cache bank spreading value; and
replacing the one or more bank select bits with the cache bank spreading value.

22. The non-transitory processor-readable medium of claim 21, wherein the stored processor-executable instructions are configured to cause a processor, a bank spreading function component, and a cache memory controller to perform operations such that:

executing the cache bank spreading function comprises using one of an exclusive OR operator with operands, a logical operation, an arithmetic operation, selecting a random value, selecting the cache bank spreading address associated with the physical address of the cache memory access request from a table; and selecting inputs for the cache bank spreading function comprises selecting a plurality of least significant bits of conserved bits of the physical address of the cache memory device of the cache memory access request as the operands for the cache bank spreading function using an exclusive OR operator with the operands.

23. The non-transitory processor-readable medium of claim 17, wherein the stored processor-executable instructions are configured to cause a processor, a bank spreading function component, and a cache memory controller to perform operations such that executing the cache memory access request at the cache bank spreading address comprises:

writing compressed data to a first cache bank indicated by the one or more reinstated bank select bits of the cache bank spreading address different from a second cache bank indicated by one or more bank select bits of the physical address of a cache memory device of the cache memory access request; and reading the compressed data from the first cache bank indicated by the one or more reinstated bank select bits of the cache bank spreading address different from the second cache bank indicated by one or more bank select bits of the physical address of the cache memory device of the cache memory access request.

24. A computing device, comprising:

means for reinstating one or more bank select bits of a physical address of a cache memory access request producing a cache bank spreading address; and means for executing the cache memory access request at the cache bank spreading address.

25. The computing device of claim 24, further comprising means for determining whether compressed data fits on a cache line of a single cache bank of a cache memory device, wherein means for reinstating one or more bank select bits of a physical address of a cache memory access request producing a cache bank spreading address comprises means for reinstating the one or more bank select bits of the physical address of the cache memory access request producing the cache bank spreading address in response to determining that the compressed data fits on a single cache bank of the cache memory device.

26. The computing device of claim 25, wherein means for determining whether the compressed data of the cache memory access request fits on a single cache bank of the cache memory device comprises means for determining whether a compression ratio of the compressed data is greater than or equal to a 2:1 compression ratio.

27. The computing device of claim 25, wherein means for determining whether the compressed data of the cache memory access request fits on a single cache bank of the cache memory device comprises means for determining whether a size of the compressed data is less than or equal to a size of a cache line of the cache memory device.

28. The computing device of claim 25, wherein means for reinstating one or more bank select bits of the physical address of the cache memory access request producing the cache bank spreading address in response to determining that the compressed data fits on a cache bank of the cache memory device comprises:
- means for selecting inputs for a cache bank spreading function;
- means for executing the cache bank spreading function;
- means for returning a cache bank spreading value; and
- means for replacing the one or more bank select bits with the cache bank spreading value.

29. The computing device of claim 28, wherein:
- means for executing the cache bank spreading function comprises means for using one of an exclusive OR operator with operands, a logical operation, an arithmetic operation, selecting a random value, selecting the cache bank spreading address associated with the physical address of the cache memory access request from a table; and
- means for selecting inputs for the cache bank spreading function comprises means for selecting a plurality of least significant bits of conserved bits of the physical address of the cache memory device of the cache memory access request as the operands for the cache bank spreading function using an exclusive OR operator with the operands.

30. The computing device of claim 24, wherein means for executing the cache memory access request at the cache bank spreading address comprises:
- means for writing compressed data to a first cache bank indicated by the one or more reinstated bank select bits of the cache bank spreading address different from a second cache bank indicated by one or more bank select bits of the physical address of a cache memory device of the cache memory access request; and
- means for reading the compressed data from the first cache bank indicated by the one or more reinstated bank select bits of the cache bank spreading address different from the second cache bank indicated by one or more bank select bits of the physical address of the cache memory device of the cache memory access request.

* * * * *